United States Patent [19]

Saeed et al.

[11] 4,269,384
[45] May 26, 1981

[54] COLLAPSIBLE STRUCTURES EMPLOYING FRANGIBLE CONNECTIONS

[75] Inventors: Amin Saeed, Brampton; James B. Hill, Oakville, both of Canada

[73] Assignee: DAF Indal Ltd., Mississauga, Canada

[21] Appl. No.: 36,814

[22] Filed: May 7, 1979

[51] Int. Cl.³ .................. F16M 13/00; E04B 1/00
[52] U.S. Cl. ................... 248/548; 52/98; 403/2
[58] Field of Search ........... 52/98; 403/2; 248/548, 248/DIG. 9; 85/5 CP; 343/880, 890, 871; 404/10

[56] References Cited

U.S. PATENT DOCUMENTS

| | | | |
|---|---|---|---|
| 2,309,041 | 1/1943 | Booker et al. | 52/98 X |
| 2,683,011 | 7/1954 | Haggerty | 52/98 X |
| 2,748,578 | 6/1956 | Potts | 403/2 X |
| 3,439,947 | 4/1969 | Luckenbill et al. | 403/2 |
| 3,521,413 | 7/1970 | Scott et al. | 52/98 |
| 3,637,244 | 1/1972 | Strizki | 52/98 |
| 3,837,752 | 9/1974 | Shewchuk | 52/98 X |
| 3,967,906 | 7/1976 | Strizki | 52/98 X |

Primary Examiner—J. Karl Bell
Attorney, Agent, or Firm—Ivor M. Hughes

[57] ABSTRACT

A structure for the support of equipment which may be struck by a moving body, the structure comprising a plurality of relatively rigid members and a plurality of frangibly connected joints connecting the plurality of relatively rigid members, each frangibly connected joint including a frangible region oriented with its longitudinal axis in the horizontal direction, the frangible region comprising a relatively brittle material of high strength, wherein the yield point of the material and its ultimate tensile strength are relatively close, to primarily shear under extraordinary loads when applied close to the frangible region but to fail under the combined action of shear and normal stress when loads are applied to the rigid members remote the frangible region, whereby the frangible joints receiving forces transmitted thereto after impact by a moving body with the structure will fail partially or completely and in the event of partial failure, will transmit the remaining forces to at least a second frangible joint for the failure thereof and the collapse of the structure, into smaller sections. In one embodiment, an ILS supporting bridge, for supporting an array of antenna is provided.

17 Claims, 14 Drawing Figures

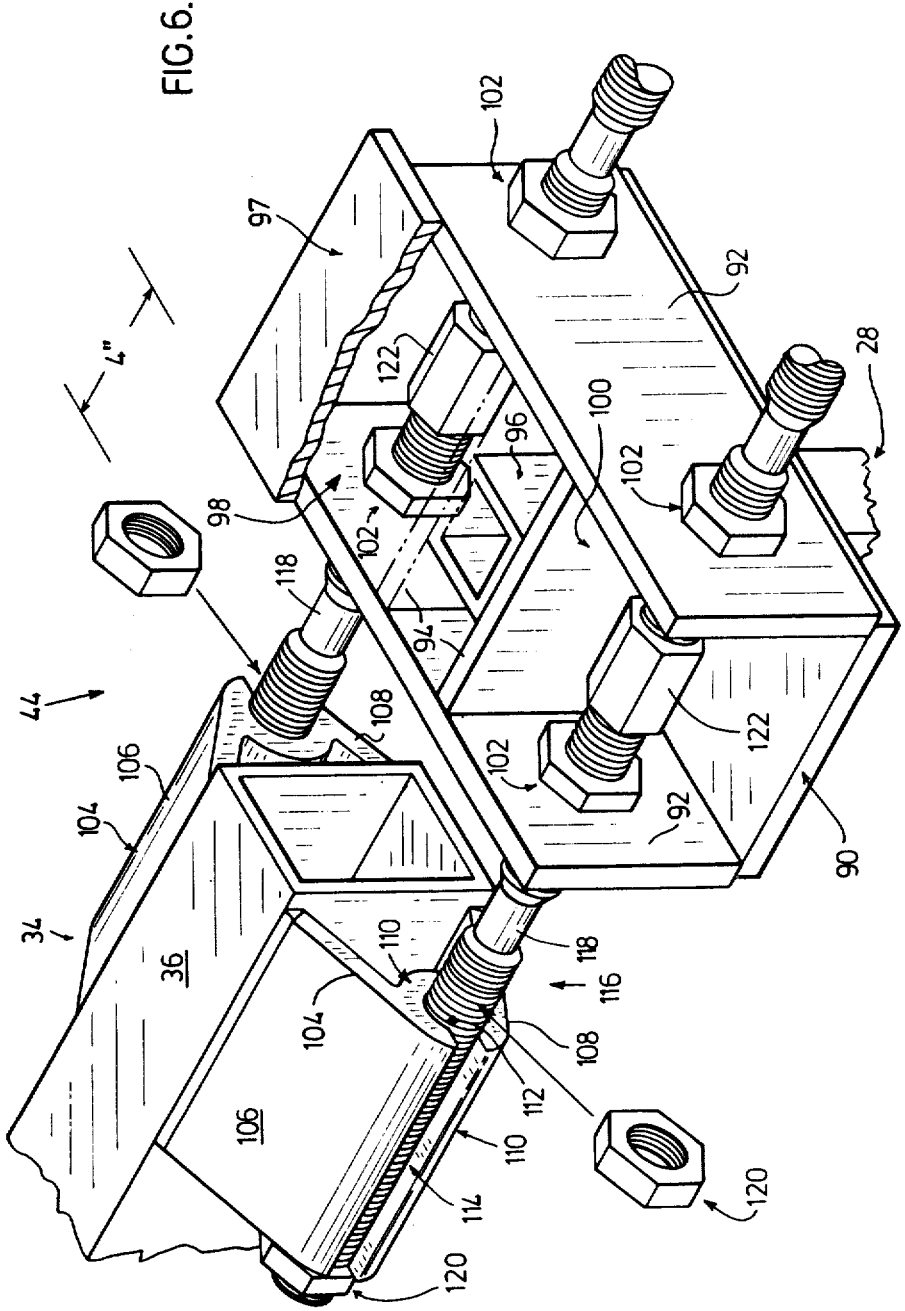

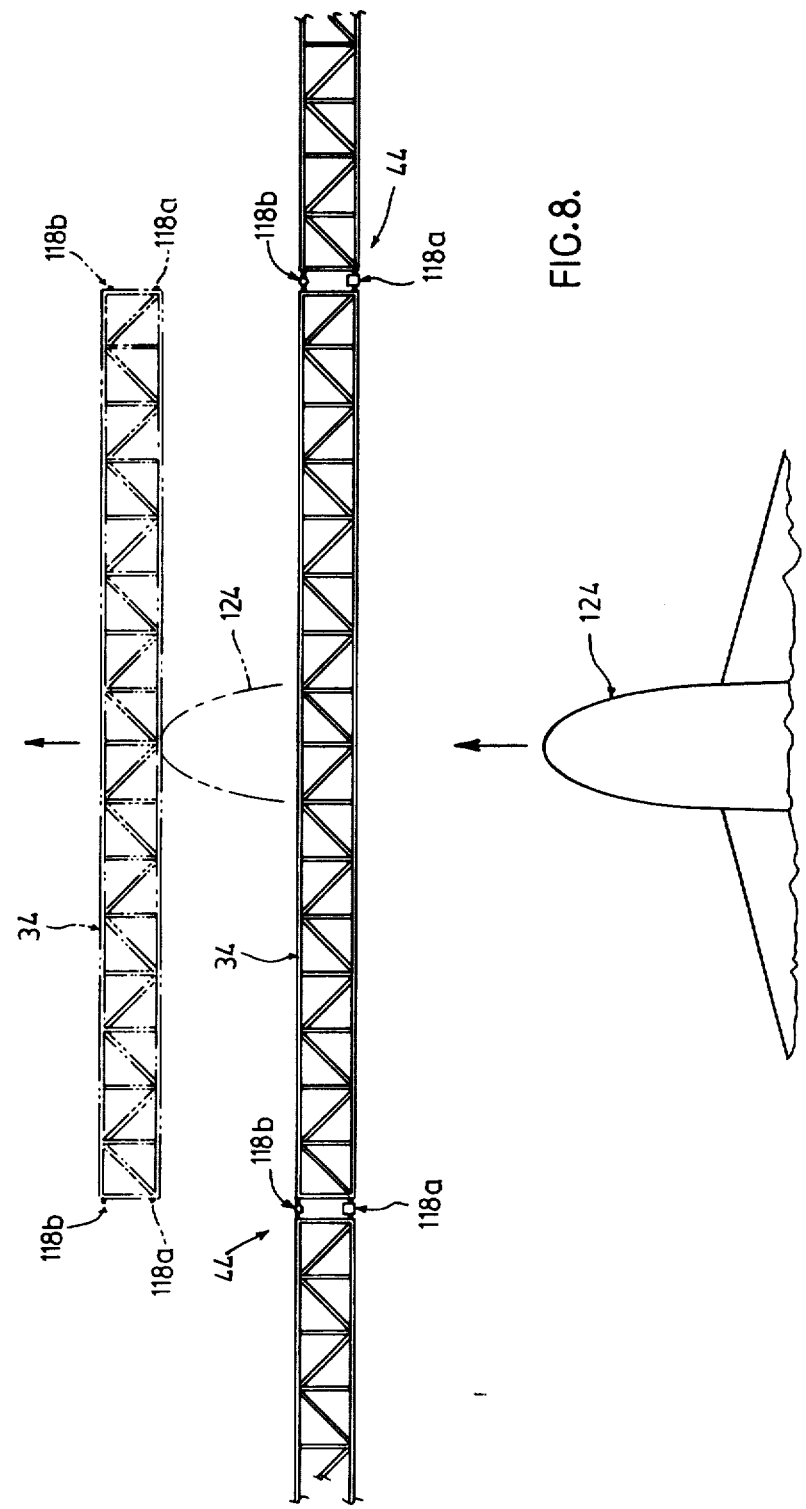

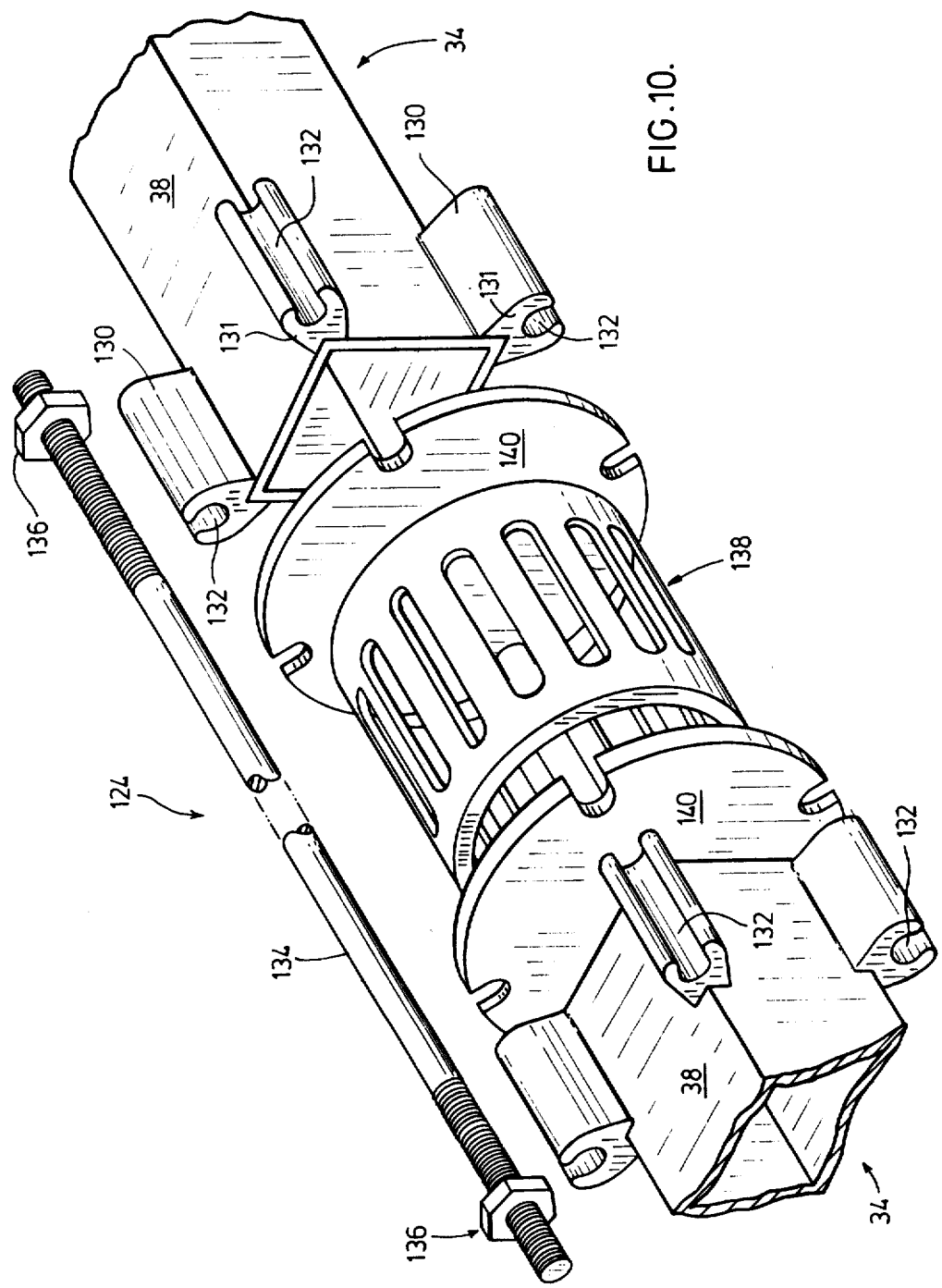

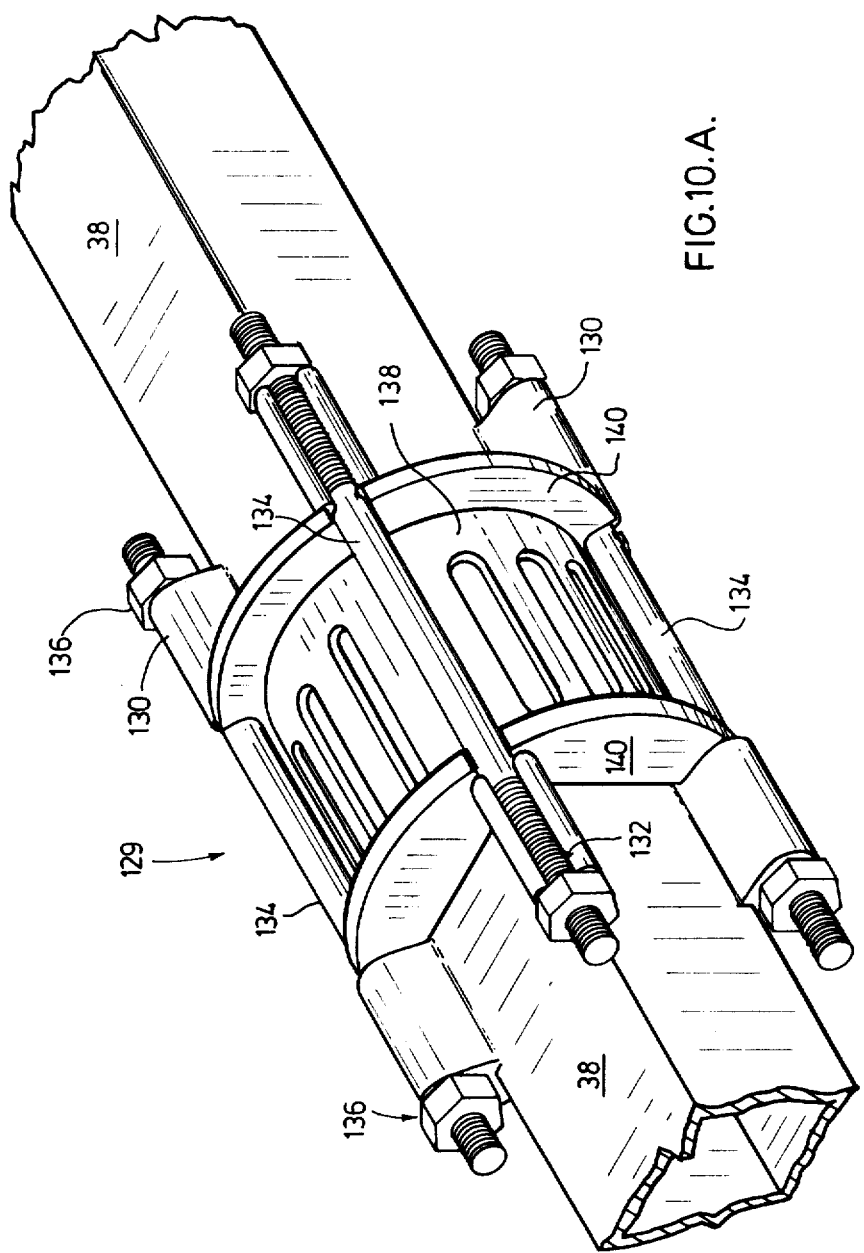

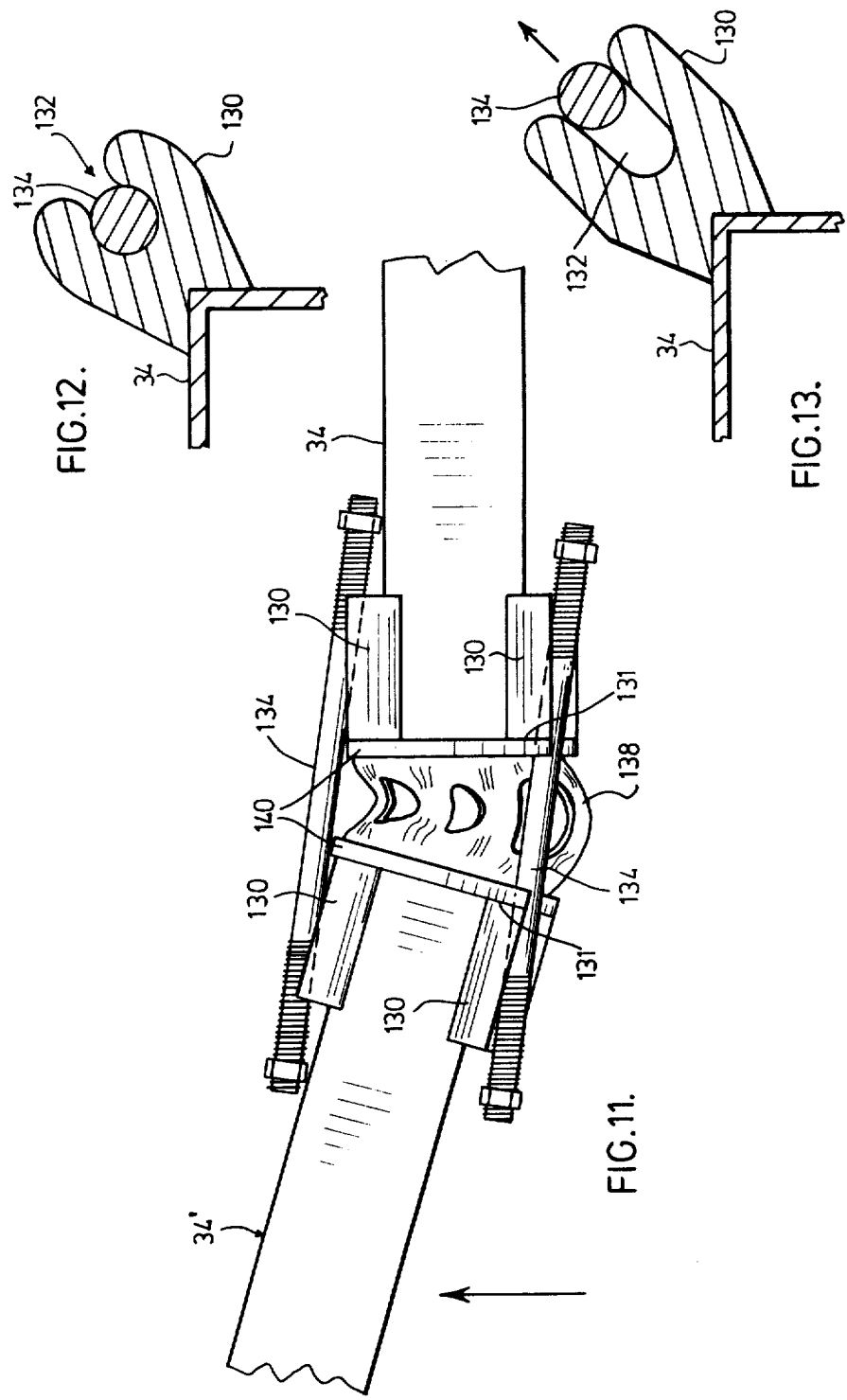

COLLAPSIBLE STRUCTURES EMPLOYING FRANGIBLE CONNECTIONS

FIELD OF INVENTION

This invention relates to break-away structures employing frangible connections in their construction and finds particular application in the erection of ILS supporting bridge members across one end or both ends of the runway, for supporting arrays of antennas, used by approaching aircraft for monitoring the center line of the runway.

BACKGROUND OF THE INVENTION

The precise position of approaching aircraft relative to the runway must be known to the pilot at all times and in all environmental conditions. Therefore, any readings received by the pilot from the equipment used for monitoring the position of his aircraft must be accurate, even in extreme weather conditions—severe thunderstorms, snow squalls, freezing rain, high winds, dense fog and the like. For the purposes of assisting the pilot, arrays of antennas are situated at for example, both ends of the runway, and over one of which arrays of antennas the aircraft must fly to reach the runway. In cases where false readings may be of concern (as for example, from vehicular traffic from a nearby highway) the arrays of antennas are associated with a reflecting screen. In Canada, Transport Canada has ordained that the situated arrays of antenna must not collapse, while withstanding 100 m.p.h. gusted wind, and carrying radial ice one inch in thickness, and must give accurate signals while withstanding 80 m.p.h. gusted wind, and carrying the same thickness radial ice. To achieve this end, the arrays of antenna (and reflecting screen, where necessary) are presently anchored in concrete pillars or posts, anchored into the ground. These posts are positioned at intervals of for example 239 cm. from their centre lines spanned by a bridge walkway for ready access to the antennas;

While the above structure fulfills Canadian Government Regulations, it also falls within the definition of a "fortress". Any aircraft inadvertently approaching the runway too low or, attempting to land short of the runway, will impact this fortress with such force that the aircraft will be torn apart with a high probability of loss of life;

It is therefore an object of this invention to provide a break-away structure, as for example, an ILS supporting bridge, employing frangibly connected joints being capable of failing in three modes—shear, tension and compression—to thereby reduce the destruction of any body impacting the break-away structure whereby the frangible joints receiving forces transmitted thereto after impact by a moving body with the structure will fail partially or completely, and in the event of partial failure, will transmit the remaining forces to at least a second frangible joint for the failure thereof and the collapse of the structure into smaller sections.

It is a further object of this invention to provide break-away ILS supporting bridge structures employing frangible connections in their construction which structures are capable of providing the necessary support for arrays of antenna used for signalling incoming aircraft, and which structures not only comply with Governmental Regulations, but also reduce the damage caused any aircraft impacting same;

Further and other objects of the invention will be realized by those skilled in the art from the following summary of the invention and detailed description of preferred embodiments thereof;

SUMMARY OF THE INVENTION

According to one aspect of the invention, frangibly connected joints are provided in break-away structures, the frangibly connected joints, suitable for joining substantially rigid ductile members, each frangible including a frangible region oriented in the horizontal direction when joining the members and capable of failing in three modes—shear, tension and compression—the frangible region comprising a high strength relatively brittle material (preferably a corrosion resistant metal) having its yield point and ultimate tensile strength relatively close together, primarily shearing when extraordinary loads are applied adjacent the frangible region but failing under the combined action of shear and normal stresses (tension or compression) when extraordinary loads are applied to the connected members remote the frangible region. For example, the frangible region may comprise predetermined necking of reduced cross-section relative to the remainder of the frangible connection.

The frangible region may comprise a Type 400 Serial stainless steel, for examle, a Type 416 or Type 431 stainless steel, a Type 17-4 PH (Precipitation Hardening) stainless steel, or a metal of like characteristics (preferably tempered Type 431 stainless steel) but not a Type 300 Series of stainless steel, as for example, Type 304 stainless steel or a metal of like characteristics, because the joint requires the relative closeness of the yield point of the material comprising the frangible region and its ultimate tensile strength, for example, tempered Type 431 stainless steel has a yield point of 150,000 P.S.I. and an ultimate tensile strength of 188,000 P.S.I., and a H900 hardened Type 17-4 PH stainless steel has a yield point of 178,000 P.S.I. and an ultimate tensile strength of 200,000 P.S.I., so that when the break-away structure is impacted, the frangible region appears to immediately fail under extraordinary loads applied to the members rather than deforming before failing.

Type 304 stainless steel would appear to the eye to first yield deforming and then ultimately fracture because of the extremes between the yield point of the metal (42,000 P.S.I.) and its ultimate tensile strength (84,000 P.S.I.);

The frangible region may be mounted or contained in a predetermined length of metal of the desired characteristics supported to join the rigid ductile members. In this regard, the member having the frangible region may be supported in housings secured to the rigid ductile members to be joined.

According to another aspect of the invention, a frangible connection is provided including:

(a) splice bolts of predetermined length and of predetermined diameter having means on their ends to enlarge their diameter adjacent their ends, one of said means being removable;

(b) claws to be supported adjacent the ends of members to be joined to receive the splice bolts, each claw having a mouth opening outwardly along its length from a channel extending longitudinally within the claw and opening at either end of a diameter to snugly receive the splice bolt, the mouth normally being narrower than the splice bolt but upon extraordinary force being applied radially outwardly by the splice bolt against the claw walls adjacent the mouth, the mouth will be forceably expanded to permit passage of the splice bolt out of the claw;
and (c) a spacer member of predetermined strength supported between the splice bolts and members to be connected, preferably being of thin hollow slotted or perforated piece of material;

According to another aspect of the invention, a structure is provided, comprising a plurality of relatively rigid members and a plurality of frangible connections (frangibly connected joints) joining the relatively rigid members, each connection including a frangible region oriented with its longitudinal axis oriented in the horizontal direction, the frangible region comprising a relatively brittle material of high strength, wherein the yield point of the material and its ultimate tensile strength are relatively close, primarily to shear under extraordinary loads applied close to the frangible region but to fail under the combined action of shear and normal stress (tension and compression) when extraordinary loads are applied to the rigid members remote the frangible region whereby the frangible joints receiving forces transmitted thereto after impact by a moving body with the structure will fail partially or completely, and in the event of partial failure, will transmit the remaining forces to at least a second frangible joint for the failure thereof and the collapse of the structure into smaller sections. Preferably, the rigid members and frangible connections are relatively compatible to minimize galvanic action therebetween as for example, aluminum (rigid member) and tempered Type 431 stainless steel or Type 17-4 PH stainless steel (frangible connections);

According to another aspect of the invention, the frangible region may comprise necking of reduced cross-section relative to the remainder of the connection;

According to another aspect of the invention, frangible connections may be used as the sole means to anchor a bent or tower to the ground, each leg of the bent or tower being of a predetermined thickness, each frangible connection comprising each leg, having a horizontally disposed opening therethrough a predetermined distance from the bottom, a housing for securing to the ground for receiving the leg therein and having opposed horizontally disposed apertures through opposed wall portions of the housing of the same cross-section as the opening extending through the leg a predetermined distance from the bottom of the housing greater than the distance the opening in the leg is disposed from the bottom of the leg, the distance between opposed wall portions being slightly greater than the outer thickness of the leg, a rod of the same cross-section as the opening and aperture in the leg and housing respectively, of a length greater than the distance between the opposed apertures through the opposed wall portions of the housing, the rod having necked portions of reduced diameter disposed intermediate the length of the rod, for disposition in the spaces between the housing and leg when the rod is positioned through the openings and apertures in the leg and housing, and means securing the rod within the opening and apertures in the leg and housing, the rod comprising a high strength relatively brittle material, having its yield point and ultimate tensile strength relatively close as previously described. Preferably, the material is a corrosion resistant metal;

According to another aspect of the invention the frangibly connected joints may be used to secure trusses to one another, each frangible connection comprising a connector element having a frangible region comprising a relatively brittle high strength material having its yield point and ultimate tensile strength relatively close to one another and a pair of housings secured adjacent the ends of chords of the trusses to be connected, the housing for receiving the connector element joining the trusses, the frangible connections being the only connectors used to connect the trusses;

According to another aspect of the invention, the frangible connections may be employed in the erection of an ILS supporting bridge for supporting arrays of antenna, each ILS supporting bridge including a plurality of trusses of aluminum supported by bents or towers, of aluminum, the trusses being connected to one another and the bents and/or towers by frangible connections and the bents and/or towers being anchored to the ground through the use of frangible connections as previously described whereby the frangible joints receiving forces transmitted thereto after impact by a moving body with the structure will fail partially or completely, and in the event of partial failure will transmit the remaining forces to at least a second frangible joint for the failure thereof and the collapse of the structure into smaller sections. Preferably, the bents extend upwardly between adjacent trusses to be connected and the frangible connections securely connect the trusses to the bents. In this regard, preferably a housing surrounds the top portion of, and is secured to, each bent or tower and through which housings apertures are provided aligned with housings secured to the chords adjacent the ends of the trusses, for receiving frangible members for connecting the bents or towers and trusses, the frangible members comprising a high strength corrosion resistant brittle metal wherein the yield point and ultimate tensile strength are relatively close;

Preferably the frangible members are necked to provide a frangible region of reduced cross-section relative to the remainder of the frangible member and frangible members are received in the housings so as to position the frangible necked regions in the spaces between the trusses and bents or towers, and trusses to be connected;

Preferably the frangible members are threaded except at the necked down portion (where employed) and rigidly secured by nuts within the housing on the trusses and bents or towers;

It is thus apparent if the ILS support bridge embodying the frangible connections (frangibly connected joints) is impacted close to the frangible connection, the connection will fail primarily in shear. If the same structure is impacted some distance from the frangible connections, the intermediate members being light weight and rigid in nature will remain substantially intact acting as a unit to transmit the force to the frangible regions which will fail under the combined action of shear and normal stresses (tension or compression). In this regard, it is apparent that the characteristics of the component members used will vary depending on the size of the structure, material used, and weather conditions encountered, all of which can be accounted for by a man skilled in the art to determine the characteristics of the member.

The invention will now be illustrated having regard to the drawings of embodiments of the invention.

BRIEF DESCRIPTION OF THE DRAWINGS

FIG. 6 is a perspective view of part of the structure shown in FIG. 1;

FIG. 8 is a schematic top plan view illustrating the reaction of part of the structure shown in FIG. 1 when impacted by an aircraft;

FIG. 10 is a close-up perspective exploded view of a frangible connection according to another embodiment of the invention;

FIG. 10A is an assemblied perspective view of the structure shown in FIG. 10;

FIG. 11 is a plan view illustrating deformation of the frangible connection when one of the members it connects is impacted by an aircraft;

FIGS. 12 and 13 are side views illustrating the movement of part of the structure shown in FIG. 11 before and after impact;

DETAILED DESCRIPTION OF EMBODIMENTS

Figure 1:
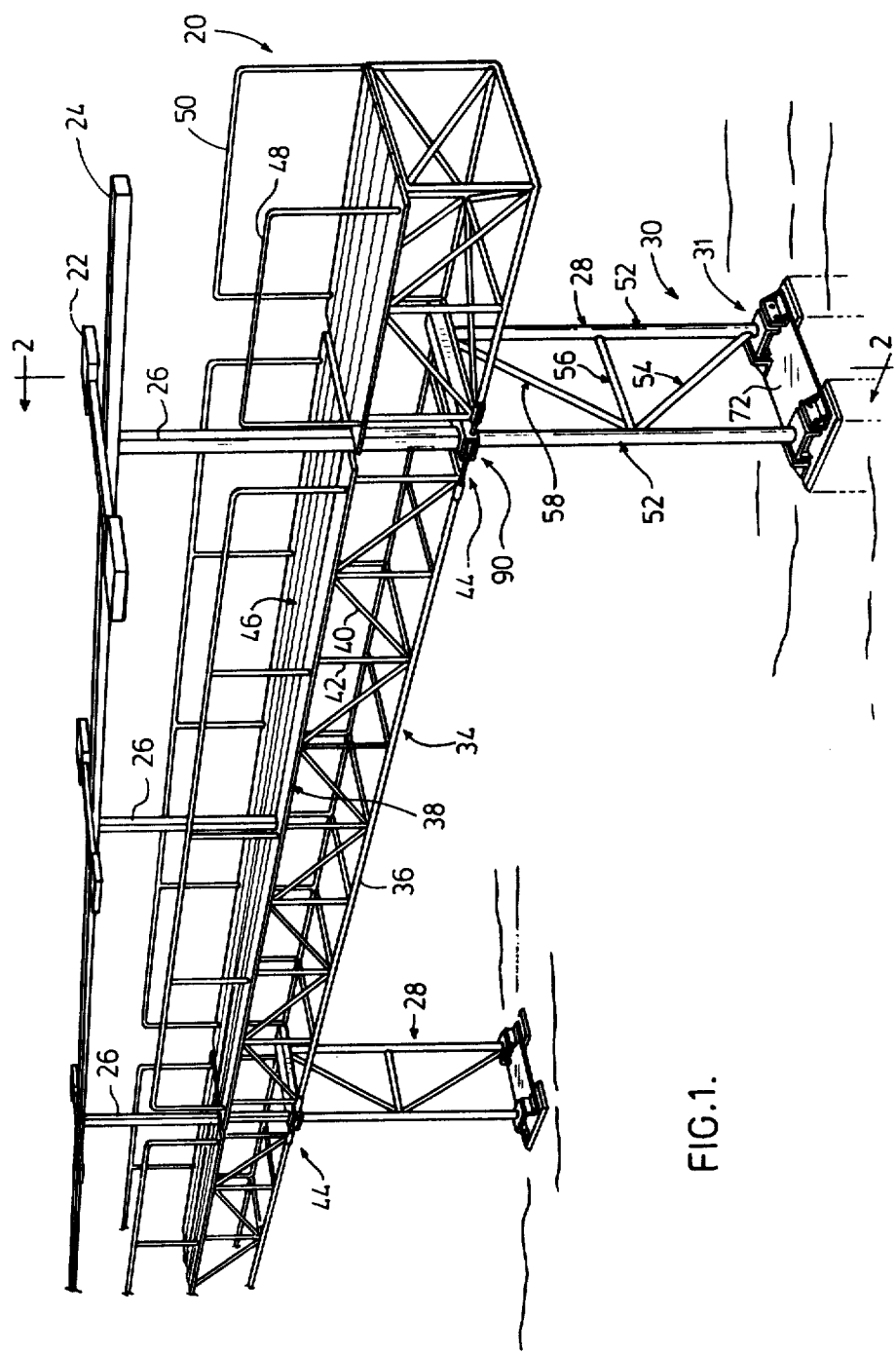
FIG. 1 is a perspective view of an ILS supporting bridge according to a preferred embodiment of the invention.
Figure 2:
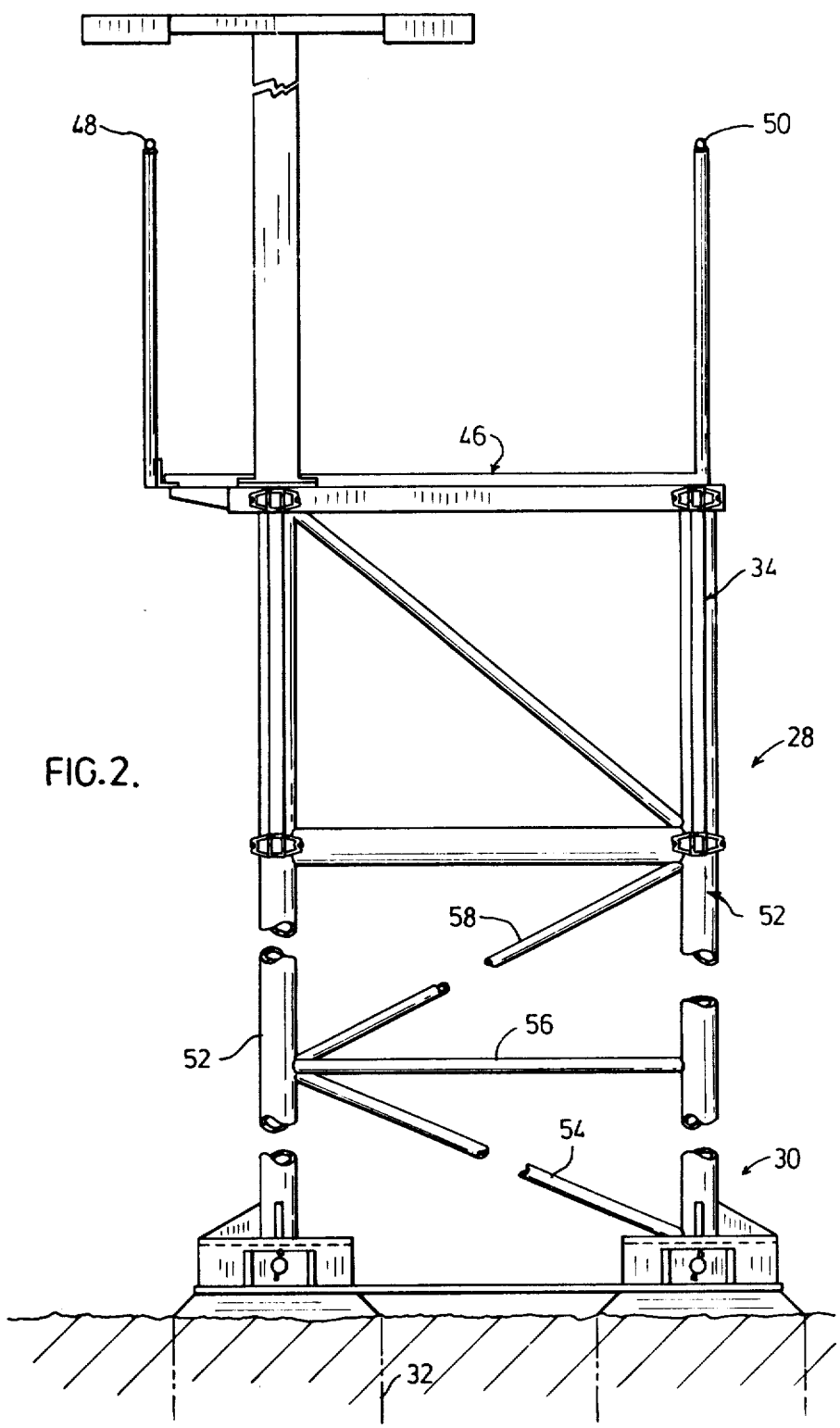
FIG. 2 is a side view of a bent forming part of the ILS supporting bridge shown in FIG. 1 taken along the line 2—2 of FIG. 1.
Figure 3:
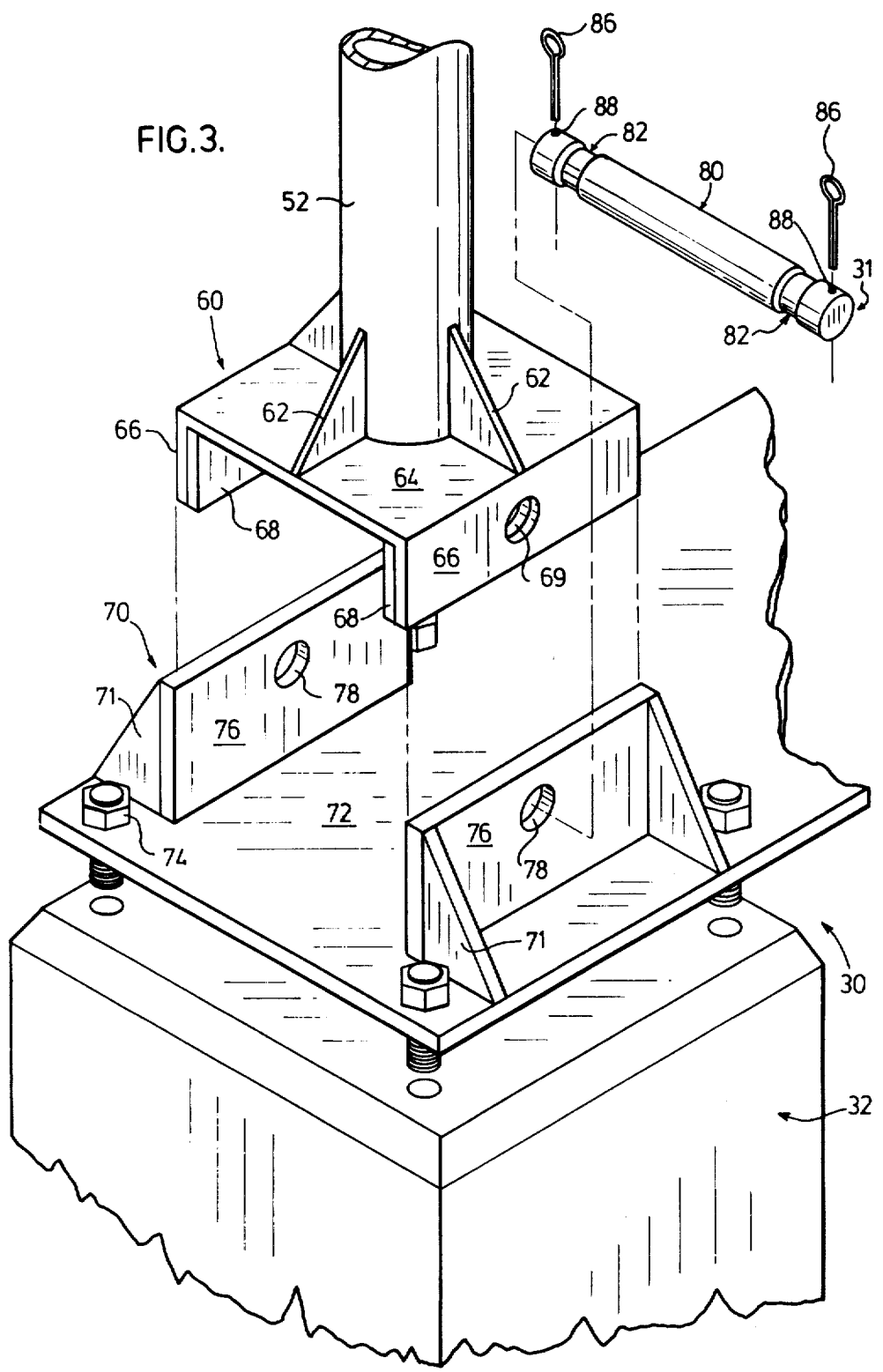
FIG. 3 is a close-up perspective partly exploded view of part of the structure shown in FIG. 2.
Figure 4:
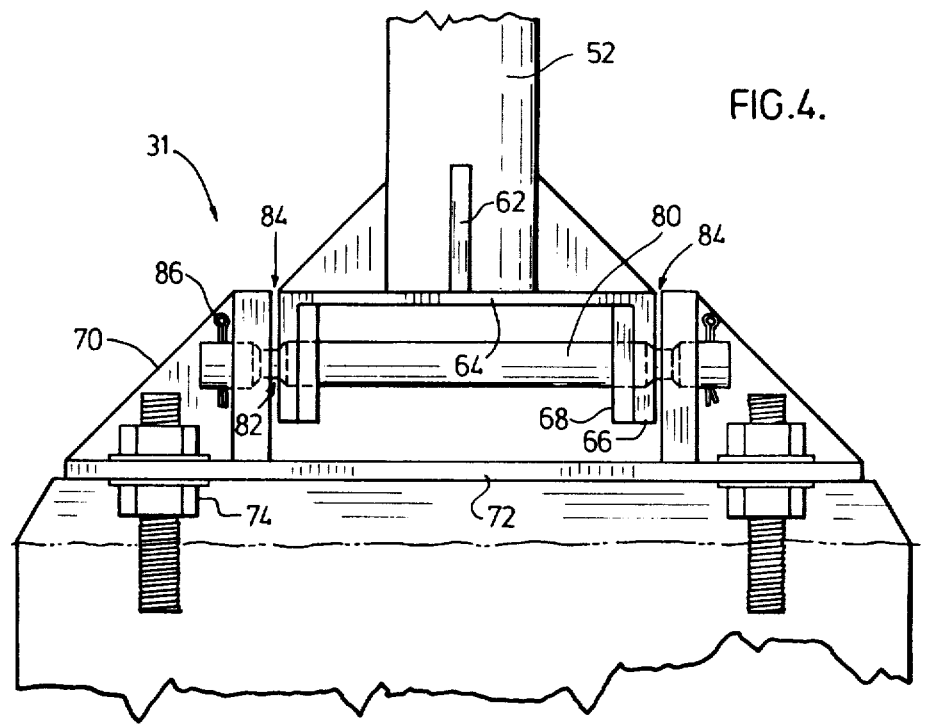
FIG. 4 is a side view of the structure shown in FIG. 3 assembled.
Figure 5:
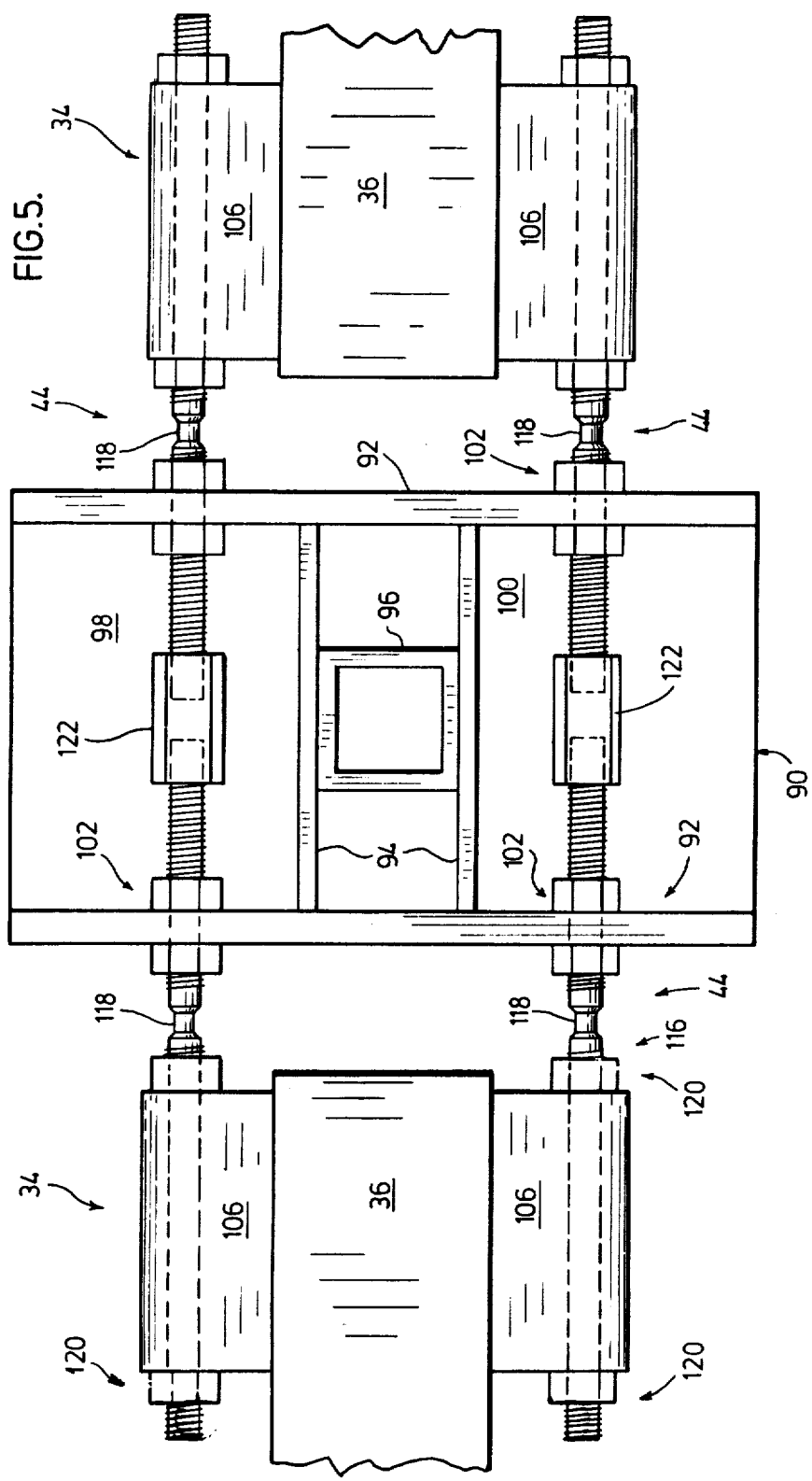
FIG. 5 is a top plan view of a frangible connection securing the structure shown in FIG. 1.

With reference to FIGS. 1 and 2 there is shown an ILS supporting bridge 20, supporting arrays of antennas 22 secured to cross support 24 running the length of bridge 20. Cross support 24 is in turn secured to vertical supports 26 secured in turn to vertically extending bents 28 made from aluminum and anchored at 30 by frangible connections (frangibly connected joints) 31 (See FIGS. 3 and 4) to concrete footings 32 implanted in the ground. Each bent 28 is secured on either side to aluminum trusses 34 by frangible connections 44 (seen best in FIGS. 5 and 6). Each of trusses 34 comprise bottom and top chords 36 and 38 supported by diagonal and vertical chords 40 and 42 respectively, welded together. Each of chords 36, 38, 40 and 42 are square in cross-section. Trusses 34 carry bridge flooring 46 and safety rails 48 and 50 being interrupted (seen best in FIG. 1), where vertical supports 26 extend upwardly from bents 28. Therefore, the only connection between adjacent trusses 34 is through frangible connections 44 and bents 28 (seen best in FIG. 5);

With reference to FIGS. 1, 2, 3, and 4, vertical bents 28 include two tubular posts 52 joined by cross-supports 54, 56, and 58. Each post 52 is secured to footing 60 at its lower extremity by triangular flanges 62 welded to base plate 64 of each footing 60. Vertical flanges 66, reinforced by inner plates 68, extend downwardly from each side of plate 64, and include, centered and aligned apertures 69 therethrough;

Both posts 52 are anchored at 30 into like anchor assemblies 70, each secured to base plate 72 by triangular flanges 71, plate 72 in turn anchored to concrete footings 32 by nut and bolt assemblies 74. Each anchor assembly 70 includes vertical plates 76 of the same length as plates 66 but of greater height and having centered and aligned apertures 78 therethrough of a distance above plate 72 greater than the sum of the distances of one-half the height of plate 66 plus one-half the diameter of aperture 69). The distance between plates 76 is slightly greater than the length of plate 64. Rod 80 manufactured from Type 431 tempered stainless steel is 1" in diameter substantially the same diameter as apertures 69 and 78 to minimize the sloppiness of the connection, and has necked portions 82 (0.4" in diameter) spaced from the ends being positioned in rod 80 so as to lie within the gaps 84 (See FIG. 4) when rod 80 secures each footing 60 to anchor 70. Locking pins 86 pushed through aperatures 88 at either of rod 80 lock and position rod 80 through apertures 69 and 78 to present portions 82 in gaps 84. With reference to FIG. 4, it can be seen that the bottom flanges 66 are spaced from plate 72 when bent 28 is secured to anchor assembly 70.

Figure 7:
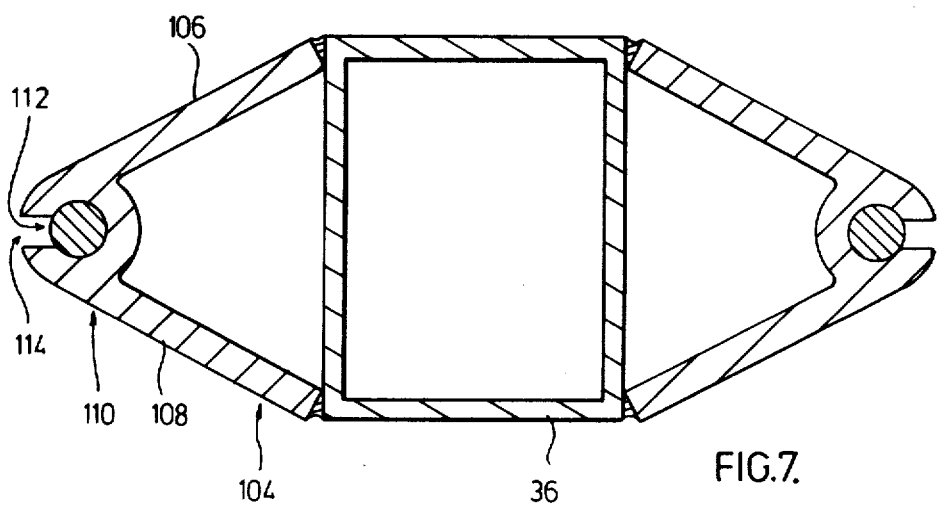
FIG. 7 (found with FIG. 4) is a close-up side view of part of the structure shown in FIG. 1.
Figure 9:
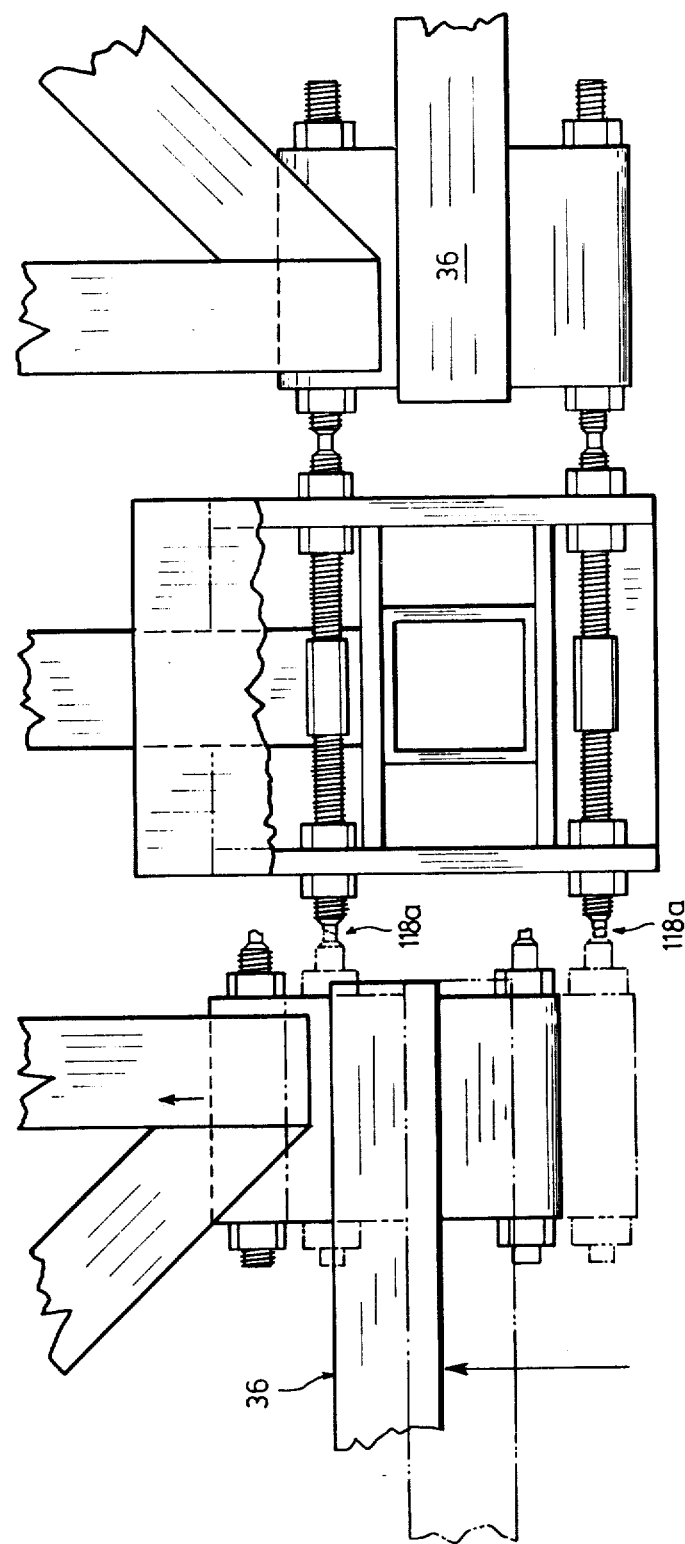
FIG. 9 is a close-up top plan view illustrating the reaction of the structure shown in FIG. 6 forming part of the structure shown in FIG. 8 when the structure shown in FIG. 8 is impacted by an aircraft.

Each of trusses 34 is in turn secured by frangible connections (frangibly connected joints) 44 to bents 28 therebetween. For this purpose, the upper end of each post 52 of each bent 28 is modified to support a box structure 90 (see FIGS. 5 and 6) comprising two plates 92 joined by cross plates 94 secured to central square tubular portion 96 secured to post 52. A cover plate 97 covers box structure 90. Therefore, box structure 90 is divided by cross plates 94 into two compartments 98 and 100. Aligned apertures 102 are provided through each of plates 92 opening into each of compartments 98 and 100;

The ends of each bottom chord 36 of truss 34 support extruded connectors 104 (Seen best in FIG. 6 and 7) welded thereto, each connector 104 comprisng angled walls 106 and 108 welded at their ends to chord 36 converging to form central sleeve 110 having longitudinally extending bore 112 therethrough and longitudinally extending mouth opening 114 therealong;

Each bore 112 is equal in diameter to, and is aligned with, apertures 102 in box portions 98 and 100 when the trusses 34 and bents 28 are erected and positioned relative to one another;

Threaded rod 116 made from tempered Type 431 stainless steel (seen best in FIG. 6) includes a necked down, unthreaded portion 118, 0.55" in diameter, positioned therealong to lie in the gap between trusses 34 and bent 28 when secured to one another. As can be seen, each rod 116, is secured at either end in bore 112 by nuts 120 at either end of sleeve 110 and, passes through aperture 102 in plate 92 having nuts secured to rod 116 on either side of plate 92. The end of rod 116 remote sleeve 110 is threaded into coupling 122 (best seen in FIGS. 5 and 6) to tightly secure each rod therein, to make the connection between the trusses and bent rigid;

With reference to FIGS. 8 and 9, an aircraft 124 impacts the aluminum truss 34 of the ILS supporting bridge 20 away from the frangible connections 44. Because of the structural rigidity of impacted trusses 34, the impact force is transmitted to couplings 44, rods 116 and necked portions 118. Because rods 116 are brittle (their yield point and ultimate tensile strength being relatively close) and because the necked portions are the weakest part of the connection, the front necked portions 118A of rods 116 fail under the combined action of tension and shear and the rear necked portions 118B fail under the combined action of compression and shear releasing truss 34 from bents 28. To the human eye, necked portions 118A and 118B would fail instantaneously before deformation of the trusses permitting truss 34 to be carried off by the aircraft, thereby minimizing damage to the aircraft.

If the aircraft had impacted closer to the fragible connections, the connection would be more likely to fail in shear with less tendency to fail under the combined action of shear and normal stress (tension and compression).

As can be seen in FIG. 8, only one of the trusses has been removed by impact. While this will not necessarily happen in each case (i.e. only removing the truss impacted), damage to the overall structure is minimized. If the wings should subsequently hit the remainder of the ILS supporting bridge, the force exerted by the wings on the aluminum bents 28 at the point of impact would cause connections 31 of front and rear parts 52 of bent 28 to fail primarily under shear. The wings would then carry off the bent 28 together with trusses 34.

To better understand the forces exerted in the frangible connection, the following calculations are offered.

I. FRANGIBLE CONNECTIONS 31 AT THE BASE OF THE BENTS 28

Maximum Vertical Load, due to dead loads, one inch radial ice, and 100 m.p.h. gusted wind: 34.35 kip Per Leg
Maximum Horizontal Load, due to 100 m.p.h. gusted wind 6.775 kip Per Bent or 3.388 kip Per Leg
Each bent foot has 4 Shear Planes across the frangible devices.

(a) ∴ Vertical Shear Force $= \frac{34.350}{4} =$ 8.694 kip (b) ∴ Horizontal Shear Force $= \frac{3.388}{4} =$ 0.847 kip Resultant Actual Shear Force =

$$\sqrt{8.694^2 + 0.847^2} = 8.735 \text{ kip}$$

Employing tempered Type 431 Stainless Steel in the frangible connections:
fy = 150 ksi (where fy is yield strength)

fy Allowable $= \frac{fy}{(FS)} = \frac{150}{1.25} =$ 120 ksi (where the Factor of Safety (FS) is 1.25) (This may vary according to any particular Situation)

(FS) Allowable =
Allowable Shear Stress $= \frac{fy}{\sqrt{3} \ (FS)} = 0.57735 \ fy = 69.282 \text{ ksi}$ ∴ Required Area of Necking $= \frac{\text{Actual Shear Force}}{\text{(FS) Allowable}} = \frac{8.735}{69.282}$
$= 0.126 \text{ in.}^2$ Diameter of Neck $= \sqrt{\frac{4A}{\pi}} = \sqrt{\frac{4 \times 0.126}{\pi}}$
$= 0.401$ inches Therefore, frangible connections employing 2-1" diameter circular rods 80 with a reduced or necked diameter of .40 inches is required.

BEARING STRESS OF ROD 80 IN APERTURES 69 and 78.

$Fb = \frac{8.735}{1'' \times 0.5 \text{ (thickness of plate 76)}} = 17.47 \text{ ksi} < 34.0 \text{ ksi}$ (Maximum allowable bearing stress as prescribed by codes)

II. CHORD FRANGIBLE DEVICES

Four frangible connections are designed for the affects of maximum gravity and wind loads and local moments at the joints of the trusses and bents (two on each side of the bents).

MAXIMUM LOADS

The following actual loads are as a result of the combined affects of dead lads, one inch radial ice and 100 m.p.h. gusted wind.

Maximum Vertical Shear Force = 3.495 kip/chord
Maximum Horizontal Shear Force = 3.858 kip/chord
Maximum Axial Load = 9.198 kip/chord
The above loads are carried by two circular rods 116 with necking 118.

Forces to be carried by one rod 116 are:
Axial Force = 9.198/2 = 4.599 kip
Vertical Shear Force = 3.495/2 = 1.748 kip
Horizontal Shear Force = 3.885/2 = 1.943 kip
Separation of the members to be joined is 4"

R = Resultant Shear
$= \sqrt{1.943^2 + 1.748^2}$
$= 2.614 \text{ kip}$

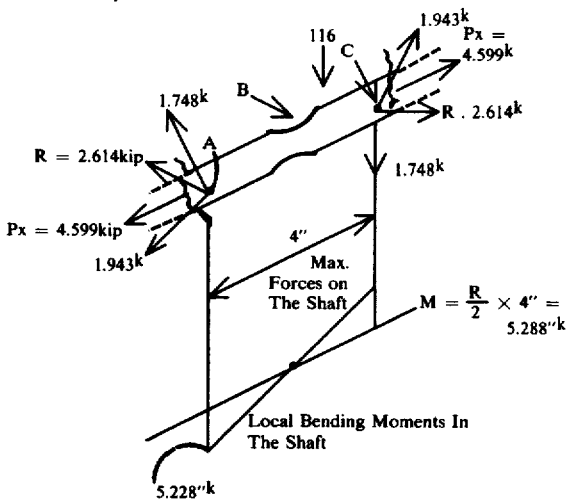

$M = \frac{R}{2} \times 4'' = 5.288''^k$

Considering threaded rod 116 having 1" diameter
Section Properties:

(a) Based on unthreaded parts of rod 116 having 1" diameter
d = 1.00 inch
$A = \frac{\pi d^2}{4} = 0.785 \text{ in}^2$
$S = \frac{\pi d^2}{4} = 0.982 \text{ in}^3$ (b) Based on Root Area of threaded part of rod 116
d = 0.8376 inch
A = 0.551 in²
S = 0.0577 in³

Stresses at points A & C of illustration on page 11
Using the root area properties $f_x = \frac{P_x}{A} = \frac{4.599}{0.551} = 8.347 \text{ ksi}$ $f_s = Pv/A = \frac{2.614}{0.23758} = 11.002 \text{ ksi}$ $f_y = \frac{M}{S} = \frac{5.228}{0.05769} = 90.624 \text{ ksi}$ $f_y = \frac{M}{S} = \frac{1.743}{0.01633} = 106.711 \text{ ksi}$ $f_s = R/A = 2.614/0.551 = 4.744 \text{ ksi}$ $f_n = \frac{f_x + f_y}{2} + \frac{1}{2}\sqrt{(f_x + f_y)^2 + 4f_s^2}$
$= 63.034 + 45.041$ (where $f_n$ is the maximum principal Stress)

$f_x = P_x/A = \frac{4.599}{0.23758} = 19.357 \text{ ksi}$ $f_n = 108.071 \text{ ksi} < 120.0 \text{ ksi}$
(maximum $f_y$ allowable)

MAXIMUM PRINCIPAL STRESS $$f_n = \frac{f_x + f_y}{2} + \sqrt{\left(\frac{f_x - f_y}{2}\right)^2 f_s^2}$$
$= 49.486 + 41.411 \text{ ksi}$
Maximum Principal Stress = 90.897 ksi < 120.0 ksi

THE NECKED 118 AREA OF THE ROD 116

Assumed ⅓ of the local moment to be acting on the reduced area (theoretically zero bending moment-See B on illustration).

$P_x = 4.599$ ksi
$M = 5.228/3 = 1.743$ in-kip
$P_s = R = 2.614$ kip

After a Series of Trial and Error Calculations, a neck diameter of 0.55 inches was used.

Type 431 stainless steel is the preferred metal for the frangible region, preferably tempered and exhibits the following characteristics:

| | Type 431 Stainless Steel | |
|---|---|---|
| | Yield Strength .2% Offset (P.S.I.) | Ultimate Strength (P.S.I.) |
| Untempered | 95,000 | 125,000 |
| Tempered Temp. 600° F. | 150,000 | 188,000 |

With reference to FIGS. 10 and 10A, another frangible connection 129 is shown. The ends of chords 38 of each truss are modified to secure four claws 130 at the corners, each claw comprising sleeve 131 being a major segment of a circle having a bore 132 therethrough, the circle being interrupted remote chord 38 to provide a mouth opening of lesser diameter than the bore 132 extending therealong. Claws 130 are of extruded aluminum. Frangible connection 129 also includes splice bolts 134 of the same diameter as bore 132, having nuts 136 removably secured to their ends for securing at either end of bores 132 of claws 130 to prevent chords 38 of adjacent trusses 34 from separating any further than the distance between nuts 136. Frangible connection 129 also includes slotted tubular spacer collar 138 made of aluminum, and slotted aluminum discs 140 (to permit splice bolts 134 to pass) on either side of collar 138 for jamming between the ends of the chords 38 by tightening nuts 136 to draw chords 38 towards one another.

When either truss is impacted and thrown out of alignment, (see FIG. 11) force is exerted on splice bolts 134 in claws 130 of trussed 34, forcing the ends of sleeve 131 apart (See FIGS. 12 and 13) peeling the splice bolts 134 therefrom. Collar 138 is also distorted. When bolts 134 are peeled out of sleeves 131, the retaining force holding the trusses together disappears thus permitting the trusses to be separated and collar 138 to fall away.

As many changes could be made to the invention without departing from the scope thereof, it is intended that all matter contained herein be interpreted as illustrative thereof and not in limiting sense.

The embodiments of the invention in which an exclusive property or privilege is claimed are as follows:

1. A structure for the support of equipment which may be struck by a moving body, the structure comprising a plurality of relatively rigid members and a plurality of frangibly connected joints connecting the plurality of relatively rigid members, each frangibly connected joint including a frangible region oriented with its longitudinal axis in the horizontal direction, the frangible region comprising a relatively brittle material of high strength, wherein the yield point of the material and its ultimate tensile strength are relatively close, to primarily shear under extraordinary loads when applied close to the frangible region but to fail under the combined action of shear and normal stress when loads are applied to the rigid members remote the frangible region, whereby the frangible joints receiving forces transmitted thereto after impact by a moving body with the structure will fail partially or completely and in the event of partial failure, will transmit the remaining forces to at least a second frangible joint for the failure thereof and the collapse of the structure into smaller sections.

2. The structure of claim 1, wherein the rigid members and plurality of frangibly connected joints connecting the relatively rigid members form a plurality of trusses.

3. The structure of claim 1, further comprising bents or towers anchoring the structure to the ground, the bents or towers being connected to the rigid members and the ground by a plurality of frangibly connected joints, each frangibly connected joint comprising a frangible region oriented with its longitudinal axis in the horizontal direction, the frangible region comprising a relatively brittle material of high strength, wherein the yield point of the material and its ultimate tensile strength are relatively close, to primarily shear under extraordinary loads when applied close to the frangible region but to fail under the combined action of shear and normal stress when loads are applied to the rigid members remote the frangible region.

4. The structure of claim 3, wherein each leg of the bent or tower is of a predetermined thickness and each frangibly connected joint securing the bent or tower to the ground comprises a horizontally disposed opening through each leg a predetermined distance from the bottom of the leg and a housing for securing to the ground for receiving the leg therein, and having opposed horizontally disposed apertures through opposed wall portions of the housing of the same cross-section as the opening extending through the leg a predetermined distance from the bottom of the housing greater than the distance the opening in the leg is disposed from the bottom of the leg, the distance between opposed wall portions being slightly greater than the outer thickness of the leg, a rod of the same cross-section as the opening and aperture of the leg and housing respectively, of a length greater than the distance between the opposed apertures through the opposed wall portions of the housing, the rod having necked portions of reduced diameter disposed intermediate the length of the rod, for disposition in the spaces between the housing and leg when the rod is positioned through the opening and passed through the apertures in the leg housing, and means securing the rod within the apertures in the leg and housing, the rod comprising high strength relatively brittle material, having its yield point and ultimate tensile strength relatively close.

5. The structure of claim 2, wherein the relatively rigid members and frangibly connected joints are relatively compatible to minimize galvanic action therebetween.

6. The structure of claim 5, wherein the frangible region is contained in a predetermined length of metal supported in housings supported on the members to be joined.

7. The structure of claim 6, wherein the frangible region comprises a necked portion disposed intermediate the ends of the predetermined length of metal.

8. The collapsible structure of claim 5 or 6 wherein the frangible region comprises either tempered or untempered Type 416 or 431 stainless stee, or Type 17-4 PH stainless steel.

9. The frangible connections of claim 4, wherein the rod material is a corrosion resistant metal.

10. the ILS supporting bridge structure of claim 1, wherein the rods and frangible members comprise either tempered or untempered Type 416 or 431 stainless steel or Type 17-4 PH stainless steel.

11. The ILS supporting bridge of claim 1, wherein the rods and frangible members comprises either tempered or untempered Type 416 or 431 stainless steel or Type 17-4 PH stainless steel.

12. An ILS bridge for supporting arrays of antenna, the ILS supporting bridge including a plurality of trusses of aluminum supported by bents and/or trusses of aluminum, trusses being connected to upper ends of the bents and/or towers by frangibly connected joints and the bents and/or towers being anchored to the ground through the use of frangibly connected joints, the joints employed to anchor the bents and or towers to the ground comprising each leg of each bent and/or tower being of predetermined thickness and having, a horizontally disposed opening therethrough a predetermined distance from the bottom of each leg and a housing securing to the ground for receiving the leg therein and having opposed horizontally disposed apertures through opposed wall portions of the housing of the same cross-section as the opening extending through the leg, a predetermined distance from the bottom of the housing greater than the distance the opening in the leg is disposed from the bottom of the leg, the distance between the opposed wall portions of the housing being slightly greater than the outer thickness of the leg, a rod of the same cross-section as the opening and aperture of the leg and housing respectively, of a length greater than the distance between the opposed apertures through the opposed wall portions of the housing, the rod having necked portions of reduced diameter disposed intermediate the length of the rod, for disposition in the spaces between the housing and leg when the rod is positioned in, and passed through the opening and apertures in the leg and housing, and means securing the rod within the opening and apertures in the leg and housing, the rod comprising a corrosion resistant high strength relatively brittle metal, having its yield point and ultimate tensile strength relatively close, and the frangibly connected joints used to secure the trusses comprises a housing surrounding the top portion of, and being secured to each bent or tower and through which housing, apertures are provided aligned with apertures provided in housings secured to chords adjacent the ends of the trusses for receiving frangible members for connecting the bents or towers and trusses, the frangible members being of a reduced diameter in the space between the trusses and bents or towers, and comprising high strength corrosion resistant brittle metal wherein the yield point and ultimate tensile strength are relative close, whereby the frangible joints receiving forces transmitted thereto after impact by a moving body with the structure will fail partially or completely and in the event of partial failure, will transmit the remaining forces to at least a second frangible joint for the failure thereof and the collapse of the structure into smaller sections.

13. The ILS supporting bridge of claim 12, wherein the metal of the connections and the aluminum of the trusses are relatively galvanically compatible to minimize the galvanic action therebetween.

14. A frangible connection comprising:
  (a) splice bolts of predetermined length and of predetermined diameter having means on their ends to enlarge the diameter adjacent the ends one of said means being removable;
  (b) claws to be supported adjacent the ends of members to be joined to receive the splice bolts, each claw having a mouth opening outwardly along its length from a channel extending longitudinally within the claw and opening at either end of a diameter to snugly receive the splice bolt, the mouth normally being narrower than the splice bolt but upon extraordinary force being applied radially outwardly by the splice bolt against the claw walls adjacent the mouth, the mouth will be forcably expanded to permit passage of the splice bolt out of the claw; and
  (c) a spacer member of predetermined strength supported between the splice bolts and members to be connected.

15. The frangible connection of claim 14, wherein the spacer member comprises a thin hollow slotted or perforated piece of material.

16. An ILS supporting bridge for supporting arrays of antenna, the ILS supporting bridge including a plurality of trusses of aluminum supported by bents and/or trusss of aluminum, the trusses being connected to one another and the bents and/or towers by frangibly connected joints and the bents and/or towers being anchored to the ground through the use of frangibly connected joints, the frangibly connected joints employed to anchor the bents and/or towers comprising a horizontally disposed opening through each leg of the bents or towers, a predetermined distance from the bottom of the leg and a housing for securing to the ground for receiving the leg therein, and having opposed horizontally disposed apertures through opposed wall portions of the housing of the same cross-section as the opening extending through the leg, a predetermined distance from the bottom of the housing greater than the distance the opening in the leg is disposed from the bottom of the leg, the distance between opposed wall portions being slightly greater than the outer thickness of the leg, a rod of the same cross-section as the opening and aperture of the leg and housing respectively, of a length greater than the distance between the opposed apertures through the opposed wall portions of the housing, the rod having necked portions of reduced diameter disposed intermediate the length of the rod, for disposition in the spaces between the housing and leg when the rod is positioned in the opening and passed through the apertures in the leg housing, and means securing the rod within the apertures in the leg and housing, the rod comprising high strength relatively brittle metal, having its yield point and ultimate tensile strength relatively close, and the frangibly connected joints used to secure the trusses and bents and/or towers comprise housing secured adjacent the ends of chords of the trusses and connector elements for positioning in the housings for joining the trusses, each connector element comprising a high strength relatively brittle metal having its yield point and ultimate tensile strength close, the frangible connections being the only connectors used to connect the trusses, whereby the frangible joints receiving forces transmitted thereto after impact by an aircraft with the ILS supporting bridge will fail partially or completely and in the event of partial failure, will transmit the remaining forces to at least a second frangible joint for the failure thereof and the collapse of the structure into smaller sections.

17. The ILS supporting bridge of claim 16, wherein the rods and connector elements comprise a corrosion resistant metal relatively galvanically compatible with aluminum.

* * * * *